United States Patent
Park et al.

(10) Patent No.: US 7,646,950 B2
(45) Date of Patent: Jan. 12, 2010

(54) METHODS AND APPARATUSES FOR MANUFACTURING FIBER GRATINGS, AND OPTICAL FIBERS HAVING FIBER GRATINGS FORMED THEREBY

(75) Inventors: Chang-Soo Park, Daejeon (KR); Tae-Young Kim, Seoul (KR); Masanori Hanawa, Yamanashi (JP)

(73) Assignee: Gwangju Institute of Science and Technology, Gwangju (KR)

(*) Notice: Subject to any disclaimer, the term of this patent is extended or adjusted under 35 U.S.C. 154(b) by 0 days.

(21) Appl. No.: 11/715,502

(22) Filed: Mar. 8, 2007

(65) Prior Publication Data

US 2008/0037935 A1    Feb. 14, 2008

(30) Foreign Application Priority Data

Aug. 8, 2006    (KR) .................... 10-2006-0074714

(51) Int. Cl.
*G02B 6/34* (2006.01)

(52) U.S. Cl. .......................................... 385/37; 65/385

(58) Field of Classification Search .................. None
See application file for complete search history.

(56) References Cited

U.S. PATENT DOCUMENTS

| 6,272,886 B1 * | 8/2001 | Novack et al. ............... 65/387 |
| 7,298,944 B2 * | 11/2007 | Ishii et al. .................... 385/37 |
| 2004/0252939 A1 * | 12/2004 | Gaylord et al. ............... 385/28 |
| 2006/0093265 A1 * | 5/2006 | Jia et al. ...................... 385/37 |

* cited by examiner

*Primary Examiner*—Uyen-Chau N Le
*Assistant Examiner*—Chad H Smith
(74) *Attorney, Agent, or Firm*—Harness, Dickey & Pierce, P.L.C.

(57) ABSTRACT

Provided are a method and apparatus for manufacturing fiber gratings capable of removing or reducing birefringence and polarization-dependence caused by fiber gratings, and an optical fiber having the fiber gratings formed thereby. The method includes: selectively exposing an optical fiber to a light source, and generating first fiber gratings on the optical fiber; and selectively exposing the optical fiber to a light source on a region spaced apart from the first fiber gratings in a longitudinal direction at a different angle from the first fiber gratings about an axis of the optical fiber, and generating second fiber gratings that are the same as the first fiber gratings. Use of the method and apparatus for manufacturing fiber gratings may effectively remove or reduce birefringence or polarization effects.

7 Claims, 9 Drawing Sheets

FBG1

FBG2

FBG2

METHODS AND APPARATUSES FOR MANUFACTURING FIBER GRATINGS, AND OPTICAL FIBERS HAVING FIBER GRATINGS FORMED THEREBY

CROSS-REFERENCE TO RELATED APPLICATION

This application claims priority to and the benefit of Korean Patent Application No. 2006-74714, filed Aug. 8, 2006, which is incorporated herein by reference in its entirety.

BACKGROUND

1. Field of the Invention

The present invention relates to a method and apparatus for manufacturing fiber gratings, and an optical fiber having the fiber gratings formed thereby, and more specifically, to a method and apparatus for manufacturing polarization-independent type fiber gratings, and an optical fiber having the fiber gratings formed thereby.

2. Discussion of Related Art

Generally, it is observed that an optical fiber has the same shape in a longitudinal direction. Therefore, except for defects caused in the manufacturing process, the optical fiber persists its configuration regardless of its portion. However, a refractive index of a core of an optical fiber may be changed in the longitudinal direction, and portions of the optical fiber having different refractive indices from other portions of the fiber are referred to as fiber gratings. In other words, the fiber gratings are periodic structures of an increased refractive index compared to other portions of a core.

The fiber gratings, one of the most important optical devices, have numerous applications such as a band-pass/reject optical filter, extraction of a clock signal, DPSK demodulation, an optical CDMA encoder and decoder, etc.

Generally, the fiber gratings are manufactured by irradiating UV rays onto an optical fiber 12, as illustrated in FIG. 1. A core of the optical fiber is formed of germanium-doped silica glass. When the UV rays from a light source 16 are irradiated onto the core, atomic binding is broken and the region where the atomic binding is broken has a different refractive index from other regions. Therefore, a mask grating 14 is disposed between the UV-ray light source 16 and the optical fiber 12, and UV rays are irradiated onto the mask grating so that fiber gratings, in which a refractive index is periodically changed, can be obtained.

However, when the fiber grating is manufactured using the above method, birefringence may be caused when light passes through the optical fiber. As disclosed by Ashish M. Vengsarkar, et al. in, "Birefringence Reduction in Side-Written Photoinduced Fiber Devices by a Dual-Exposure Method," Optics Letters, vol. 19, No. 16, p. 1260, Aug. 15, 1994, birefringence is mainly caused by geometrical asymmetry generated when fiber gratings are formed.

The cause of birefringence generation will be described below with reference to the accompanying drawings. As illustrated in FIG. 1, when it is assumed that a depth direction, toward which the UV ray is irradiated, is plotted on an x axis, and a cross-sectional direction of an optical fiber is plotted on a y axis, which is perpendicular to the x axis, FIG. 2 represents a change in refractive index ($\Delta n_x$) of the optical fiber versus the direction of the x axis, and FIG. 3 represents a change in refractive index ($\Delta n_y$) of the optical fiber versus the direction of the y axis. As can be seen from FIG. 2, as the core is closer to the light source 16 (i.e., when a value of the x axis is high), a drastic change in refractive index is observed. On the other hand, when the core is further from the light source 16 (i.e., when a value of the x axis is low), a small change in refractive index is observed. Similarly, in FIG. 3, an asymmetrical change in refractive index is shown based on a region where the UV rays are extensively irradiated.

In FIG. 2, an average value of the change in refractive index with respect to the total length of the x axis direction is represented by a dotted line. Also, in FIG. 3, an average value of the change in refractive index with respect to the total length of the y axis direction is represented by a dotted line. The inconsistency between the two average values in an optical fiber, in which the fiber gratings are formed, causes birefringence and polarization dependence, in which light energy loss is changed depending on a polarization status of light.

SUMMARY OF THE INVENTION

The present invention is directed to a method and apparatus for manufacturing fiber gratings capable of removing or reducing birefringence and polarization dependence generated by fiber gratings, and an optical fiber having the fiber grating formed thereby.

According to the present invention, birefringence and polarization dependence may be reduced by generating a pair of fiber gratings canceling birefringence effects on an optical fiber. When UV rays are irradiated to form the fiber gratings, changes in refractive index in directions of an x axis and a y axis are asymmetrically shown. Therefore, the present invention employs a technique in which other fiber gratings having the same characteristics are formed at positions rotated by a predetermined angle with respect to an axis in the longitudinal direction, preferably by 90 degrees to 270 degrees with respect to the region where the fiber gratings are formed, at positions adjacent to an optical fiber where the fiber gratings are formed. As a result, the birefringence resulting from the first fiber gratings will be canceled by the following fiber gratings.

One aspect of the present invention provides a method of manufacturing fiber gratings including: selectively exposing an optical fiber to a light source, and generating first fiber gratings on the optical fiber; and selectively exposing the optical fiber to a light source on a region spaced apart from the first fiber gratings in a longitudinal direction at a different angle from the first fiber gratings about an axis of the optical fiber, and generating second fiber gratings that are the same as the first fiber gratings.

A predetermined angle may be formed between the first fiber gratings and the second fiber gratings about the axis of the optical fiber. The second fiber gratings may be formed at 90 degrees or 270 degrees with respect to the first fiber gratings about the axis of the optical fiber.

Also, generating the second fiber gratings includes: making relative movements of the optical fiber and the light source in an axis direction of the optical fiber; rotating the fiber gratings by 90 degrees or 270 degrees in an axis direction of the optical fiber; and selectively exposing the optical fiber to the light source after making the relative movements of the optical fiber and the light source in the axis direction of the optical fiber and rotating the fiber gratings by 90 degrees or 270 degrees.

The method may further include splitting light from the light source into a first light path for forming the first fiber gratings and a second light path for forming the second fiber gratings.

The selective exposure to the light source may be performed by installing a mask grating between the light source and the optical fiber.

Also, the fiber gratings may be fiber Bragg gratings or long period fiber gratings.

Another aspect of the present invention provides an apparatus for manufacturing fiber gratings including: means for selectively exposing an optical fiber to a light source, and generating first fiber gratings on the optical fiber; and means for selectively exposing the optical fiber to a light source on a region spaced apart from the first fiber gratings in a longitudinal direction at a different angle from the first fiber gratings, and generating second fiber gratings that are the same as the first fiber gratings.

The means for generating the first fiber gratings may include a mask grating enabling the light source and light from the light source to selectively pass through the optical fiber.

The means for generating the second fiber gratings may include: an optical fiber holder for fixing an optical fiber; an optical fiber carrier for moving the optical fiber in the longitudinal direction; and an optical fiber rotator for rotating about an axis of the optical fiber.

The optical fiber rotator may rotate the first fiber gratings by 90 degrees about the axis of the optical fiber after generating the first fiber gratings. Further, the optical fiber carrier may transport the optical fiber by a predetermined distance in the axial direction after generating the first fiber gratings. The second fiber gratings may be generated on the optical fiber after rotating and transporting the optical fiber.

In addition, the fiber gratings may include a beam splitter for splitting the light of the light source. One of the lights split by the beam splitter may be provided to the means for generating the first fiber gratings, and the other of the lights split by the beam splitter may be provided to the means for generating the second fiber gratings.

The means for generating the fiber gratings may include a mirror for reflecting light from the beam splitter, a lens for concentrating the reflected light, and a mask grating enabling the light passing through the lens to selectively pass through the optical fiber.

Yet another aspect of the present invention provides an optical fiber having fiber gratings including first fiber gratings, and second fiber gratings formed on a region spaced apart from the first fiber gratings in the longitudinal direction to cancel birefringence generated by the first fiber gratings.

The second fiber gratings may be formed on a region rotated by a predetermined angle with respect to the first fiber gratings about an axis of the optical fiber. The predetermined angle may be 90 degrees or 270 degrees clockwise.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein.

Exemplary Embodiment

Figure 1:
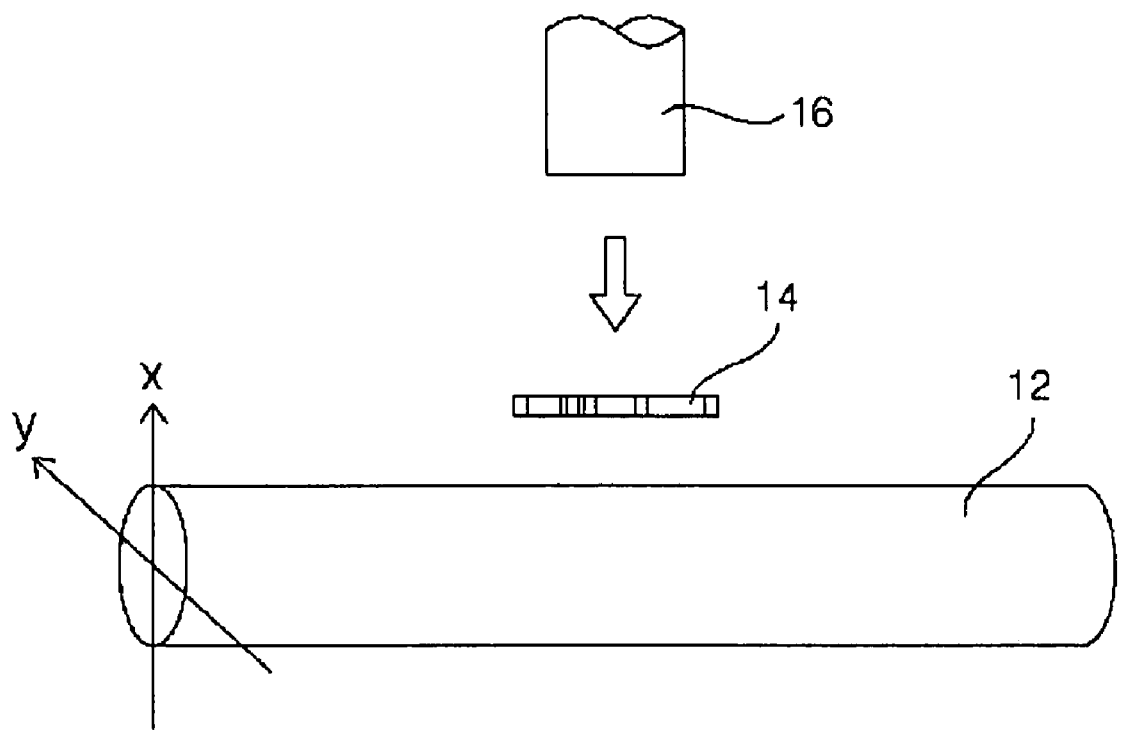
FIG. 1 schematically illustrates a method of manufacturing conventional fiber gratings.
Figure 2:
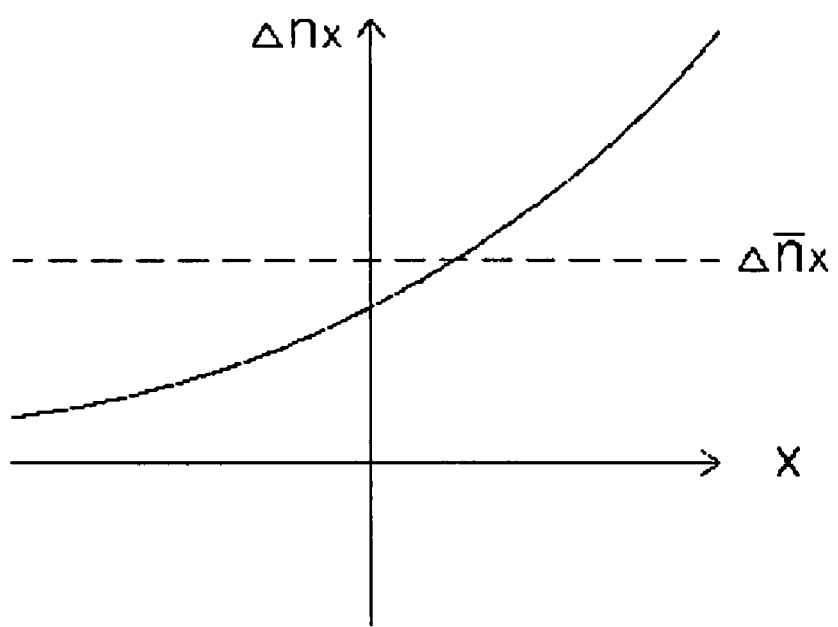
FIG. 2 is a graph illustrating a change in refractive index of an x axis with respect to the fiber gratings manufactured by the method of FIG. 1.
Figure 3:
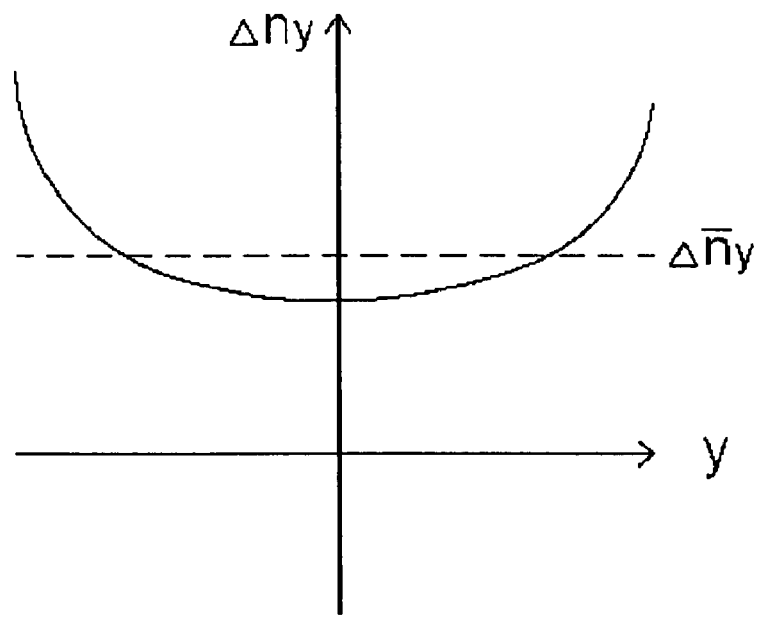
FIG. 3 is a graph illustrating a change in refractive index of a y axis with respect to the fiber gratings manufactured by the method of FIG. 1.
Figure 4A:
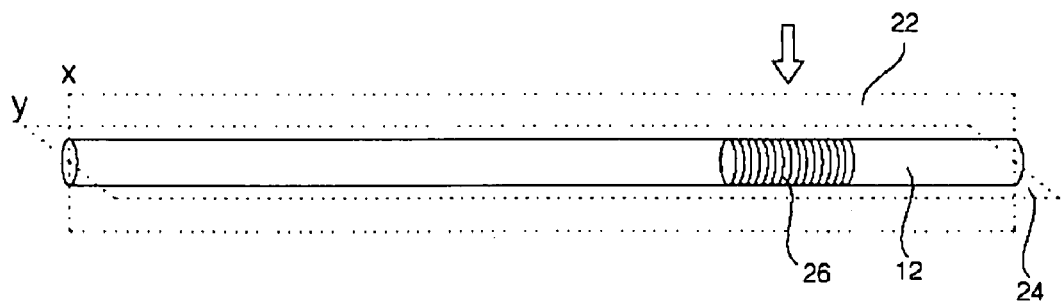
FIGS. 4a to 4c illustrate a method of manufacturing a pair of fiber gratings according to an exemplary embodiment of the present invention.
Figure 4B:
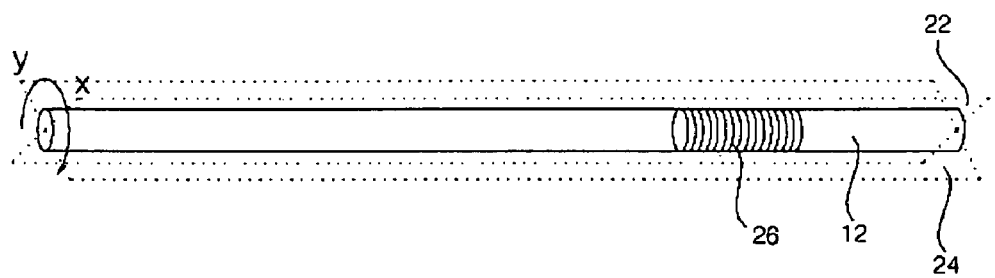
Figure 4C:
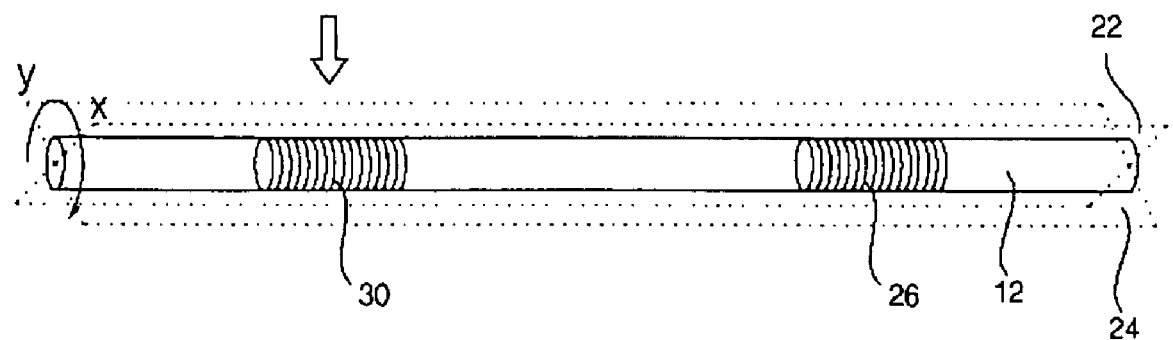

FIGS. 4a to 4c illustrate a method of manufacturing fiber gratings according to an exemplary embodiment of the present invention. As shown in FIG. 4a, UV rays are irradiated onto an optical fiber 12 in the direction of an x axis to thereby generate first fiber Bragg gratings (FBG) 26. Then, as shown in FIG. 4b, the optical fiber 12 is rotated by 90 degrees to thereby generate second FBG 30 as shown in FIG. 4c.

Figure 5A:
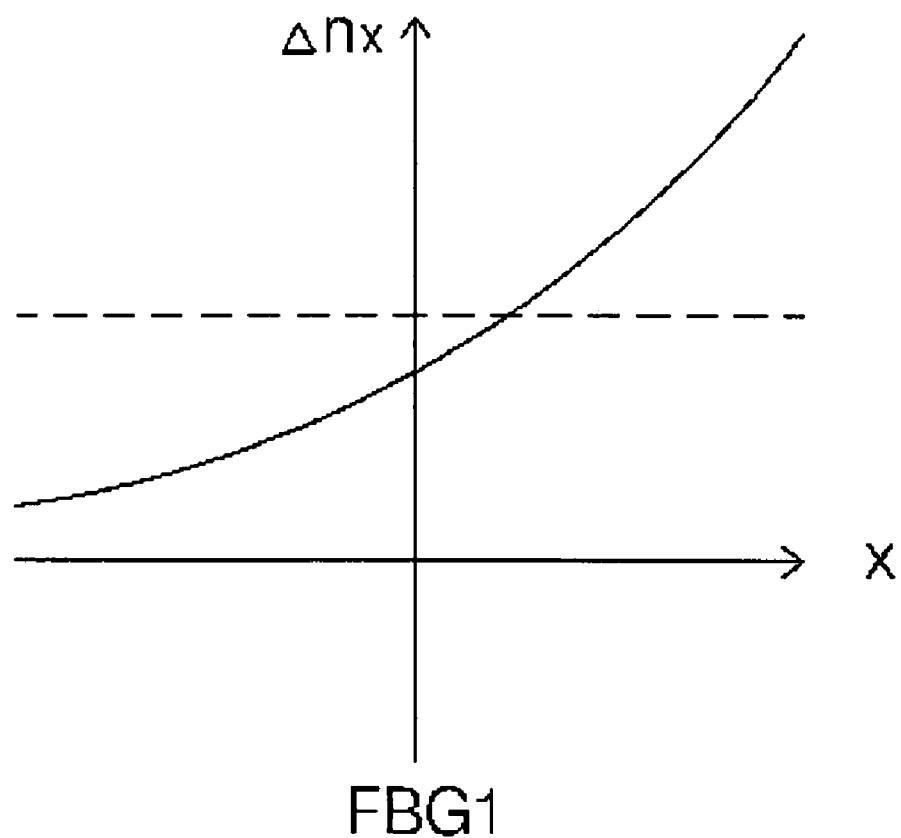
FIGS. 5a to 5d illustrate changes in refractive index of an x axis and a y axis with respect to a pair of fiber gratings according to an exemplary embodiment of the present invention.
Figure 5B:
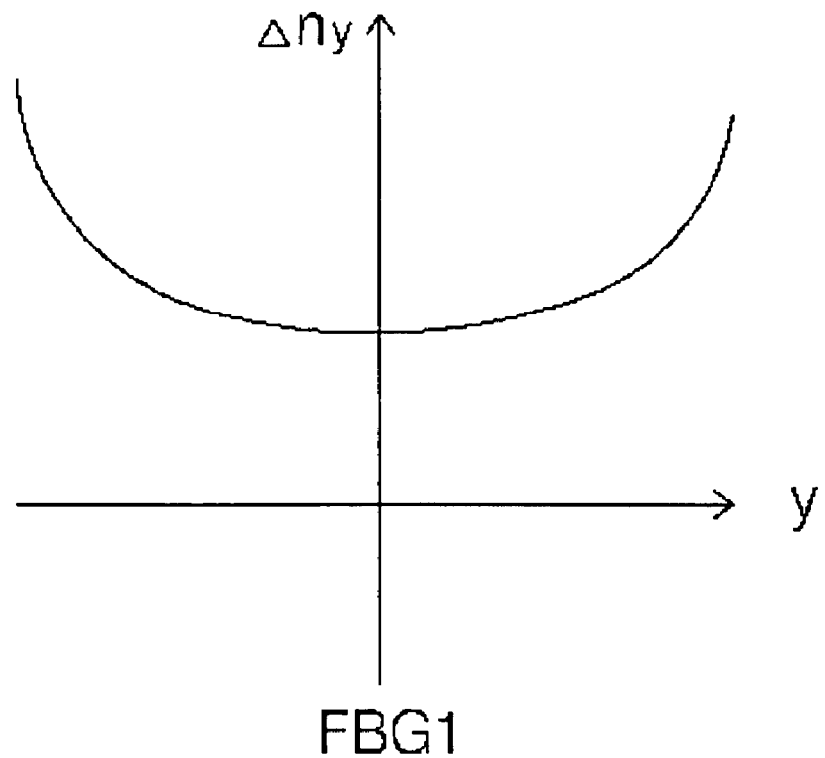
Figure 5C:
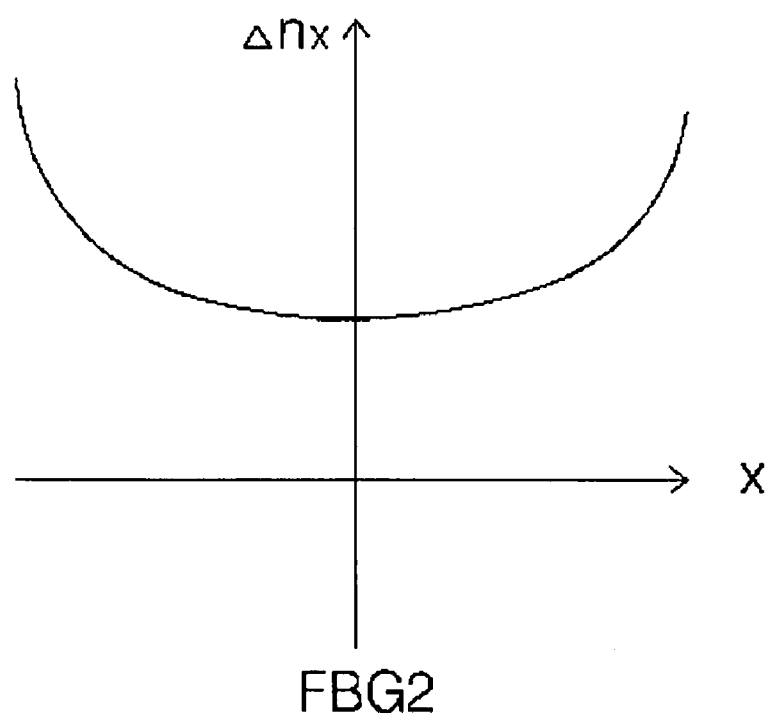
Figure 5D:
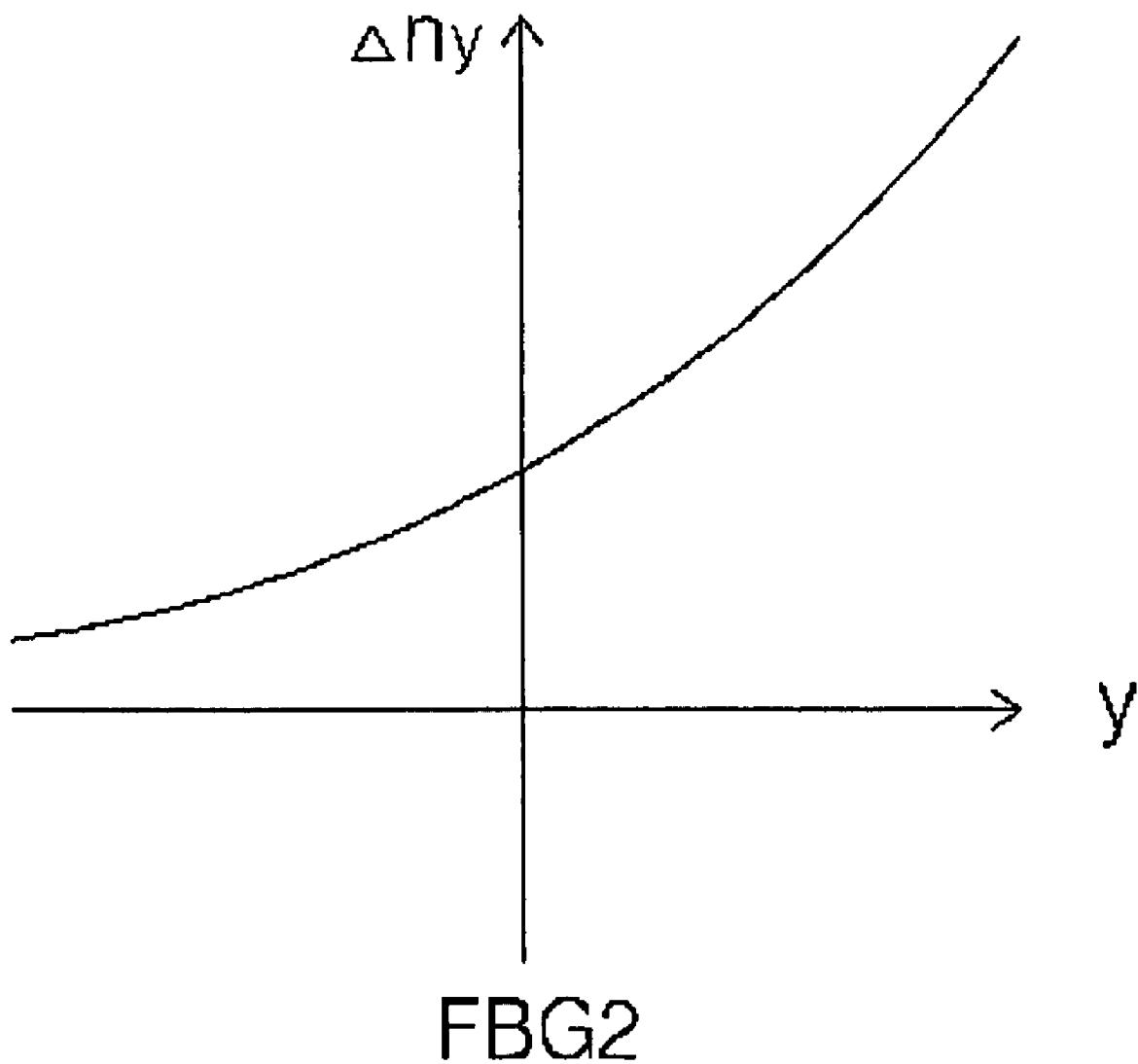

FIGS. 5a and 5b illustrate refractive indices of the first FBG (FBG1), and FIGS. 5c and 5d illustrate refractive indices of the second FBG (FBG2). UV rays are irradiated onto the first FBG (FBG1) along an x axis, and thus as a value of the x is increased, a change in refractive index is increased in the depth direction (x), and a change in the refractive index is symmetrical about a center (y=0) in the direction of a y axis as shown in FIGS. 5a and 5b. On the other hand, as shown in FIGS. 5c and 5d, UV rays are irradiated onto the second FBG (FBG2) along the y axis, and thus a change in refractive index with respect to the x axis is opposite to that of the first FBG (FBG1).

Figure 6:
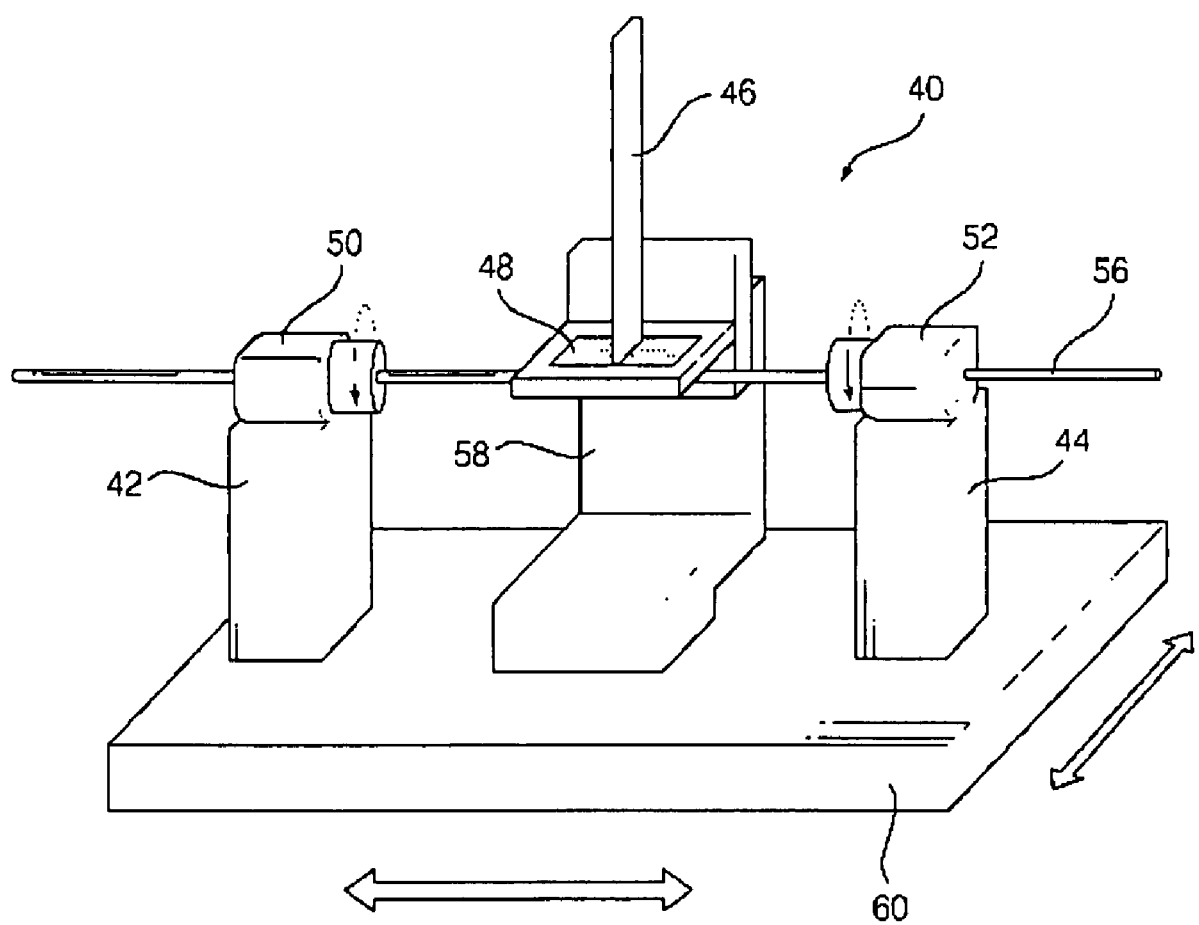
FIG. 6 is a perspective view of an apparatus for manufacturing fiber gratings according to a first exemplary embodiment of the present invention.

FIG. 6 illustrates an apparatus for manufacturing fiber gratings 40 on an optical fiber according to a first exemplary embodiment of the present invention. Optical fiber holders 42 and 44 are installed on a mount 60 that moves in forward and backward directions and from side to side. Optical fiber rotators 50 and 52 are respectively installed on the optical fiber holders 42 and 44. The optical fiber rotators 50 and 52 function to rotate an optical fiber 56 by 90 degrees or 270 degrees. A mask grating holder 58 is fixed on the mount 60, and a mask grating 48, through which a UV laser beam 46 with a uniform pattern passes, is fixed on the mask grating holder 58.

Operations of the apparatus for manufacturing the fiber grating 40 will be described hereinafter. First, the UV laser beam 46 is irradiated onto the optical fiber 56 to thereby generate a first FBG (FBG1). After the mount 60 moves a predetermined distance in the longitudinal direction of the optical fiber 56, the optical fiber rotators 50 and 52 rotate the optical fiber 56 by 90 degrees or 270 degrees. Finally, the UV laser beam 46 is irradiated onto the optical fiber 56 again to thereby generate a second FBG (FBG2). As a result, a pair of fiber Bragg gratings (FBG1 and FBG2) are formed on the optical fiber 56.

Figure 7:
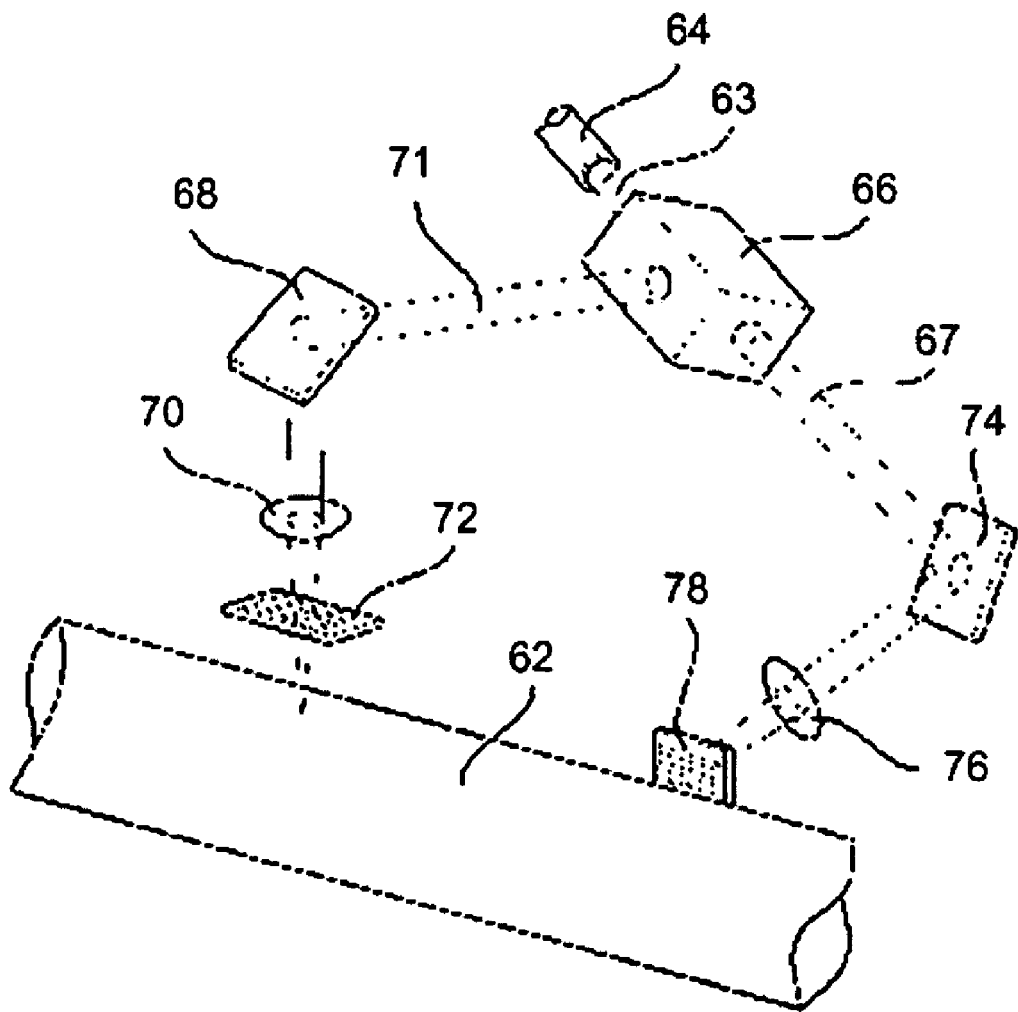
FIG. 7 is a perspective view of an apparatus for manufacturing fiber gratings according to a second exemplary embodiment of the present invention.

FIG. 7 illustrates an apparatus for manufacturing fiber gratings on an optical fiber according to a second exemplary embodiment of the present invention. In the second exemplary embodiment, a UV laser 63 from a light source 64 is split into a beam 71 for forming a first FBG and a beam 77 for forming a second FBG through a beam splitter 66. The beams split by the beam splitter 66 are respectively reflected from mirrors 68 and 74, and then pass through lenses 70 and 76 and mask gratings 72 and 78 to be irradiated onto an optical fiber 62. The beam splitter 66 splits the beams into two beams of equal intensity at a rate of 50:50. Also, the mirrors 68 and 74, the lenses 70 and 76, and the mask gratings 72 and 78 are geometrically symmetrical with each other, and have the same refractive index and transmittance. Further, the mask gratings 72 and 78 have the same shape. Therefore, the two fiber gratings formed on the optical fiber 62 have the same characteristics as each other, except that a position and an angle in the axis direction of the optical fiber are different from each other. The light source 64, the beam splitter 66, the mirrors 68 and 74, and the lenses 70 and 76 are disposed to be formed at 90 degrees to regions where the respective split beams 67 and 71 are irradiated onto the optical fiber 62, about the axis of the optical fiber. That is, positions where the laser beam 71 and the laser beam 67 are irradiated onto the optical fiber 62 are spaced apart from each other by a predetermined distance in the longitudinal direction of the optical fiber 62, and forms 90 degrees about the axis of the optical fiber 62. In the second exemplary embodiment, a pair of fiber gratings are generated by irradiating a laser beam only once.

Compared to the first exemplary embodiment, in the second exemplary embodiment, it is unnecessary to rotate the optical fiber 62 using mechanical means. On the other hand, in order for the two fiber gratings formed on the optical fiber 62 to have the same characteristics, the light source 64, the beam splitter 66, the mirrors 68 and 74, the lenses 70 and 76, and the mask gratings 72 and 78 should be precisely geometrically disposed.

Variations or modifications of the apparatus for manufacturing fiber gratings of the present exemplary embodiment may be made. For example, in the apparatus for manufacturing fiber gratings of the first exemplary embodiment, the position of the light source may be changed instead of moving and rotating the optical fiber. Also, in the second exemplary embodiment, two light sources that have the same output and characteristic may be used instead of the beam splitter 66. It should be appreciated that variations in design of the aforementioned components are to be regarded as being within the scope of the present invention.

Figure 8:
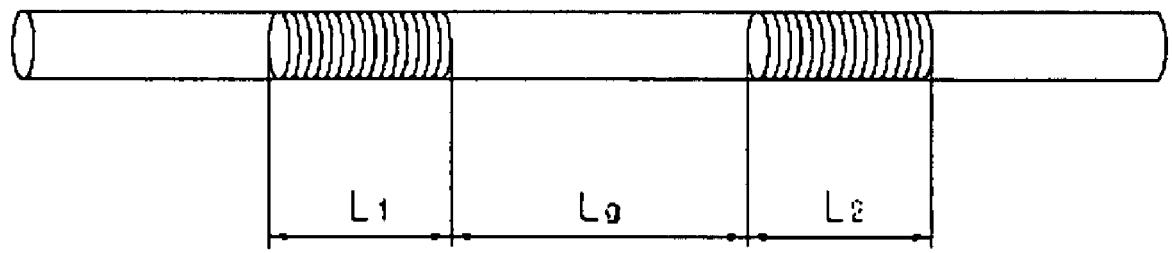
FIG. 8 illustrates an optical fiber, in which a fiber Bragg grating is formed, according to an exemplary embodiment of the present invention.

FIG. 8 illustrates an optical fiber, in which a pair of fiber gratings (FBG1 and FBG2) are formed through the first exemplary embodiment of the present invention. Here, lengths $L_1$ and $L_2$ of the fiber gratings were 1.0 mm, and a length $L_g$ between the two fiber Bragg gratings was 9.25 mm.

Variations or modifications of the optical fiber according to the present exemplary embodiment may be made. For example, long period fiber gratings may be formed instead of the fiber Bragg gratings, the lengths of the fiber gratings $L_1$ and $L_2$ may be varied, or the length $L_g$ between the fiber gratings may be varied.

Figure 9:
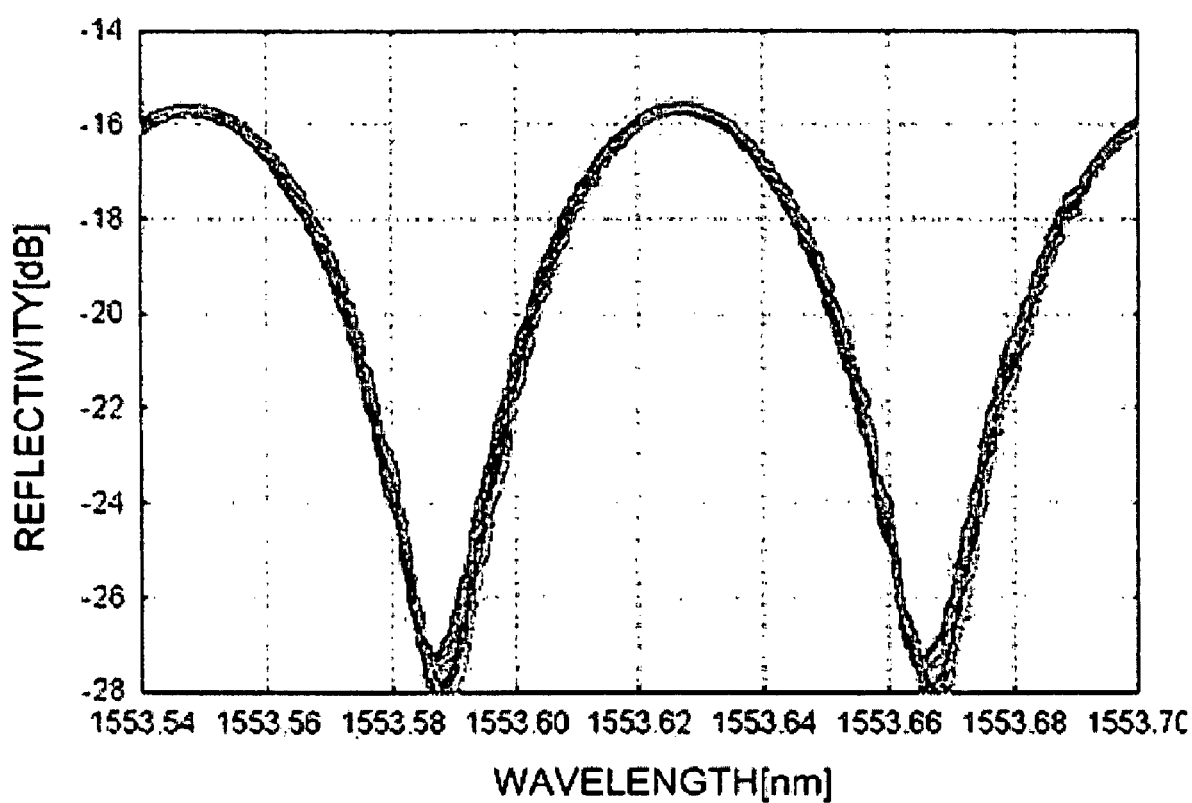
FIG. 9 is a graph of reflectivity versus wavelength in an optical fiber, in which a fiber Bragg grating is formed, according to the conventional art.

FIG. 9 is a graph of reflectivity versus wavelength in an optical fiber, in which fiber Bragg gratings are formed, according to the conventional art. More specifically, changes in reflectivity when polarization properties change with respect to the light of various wavelengths are illustrated in FIG. 9. The difference between the peak of a line that is shifted to the leftmost and the peak of a line that is shifted to the rightmost is called a Polarization Dependent Center Wavelength (PDCW) shift, and was measured as 6 pm in the present comparison example.

Figure 10:
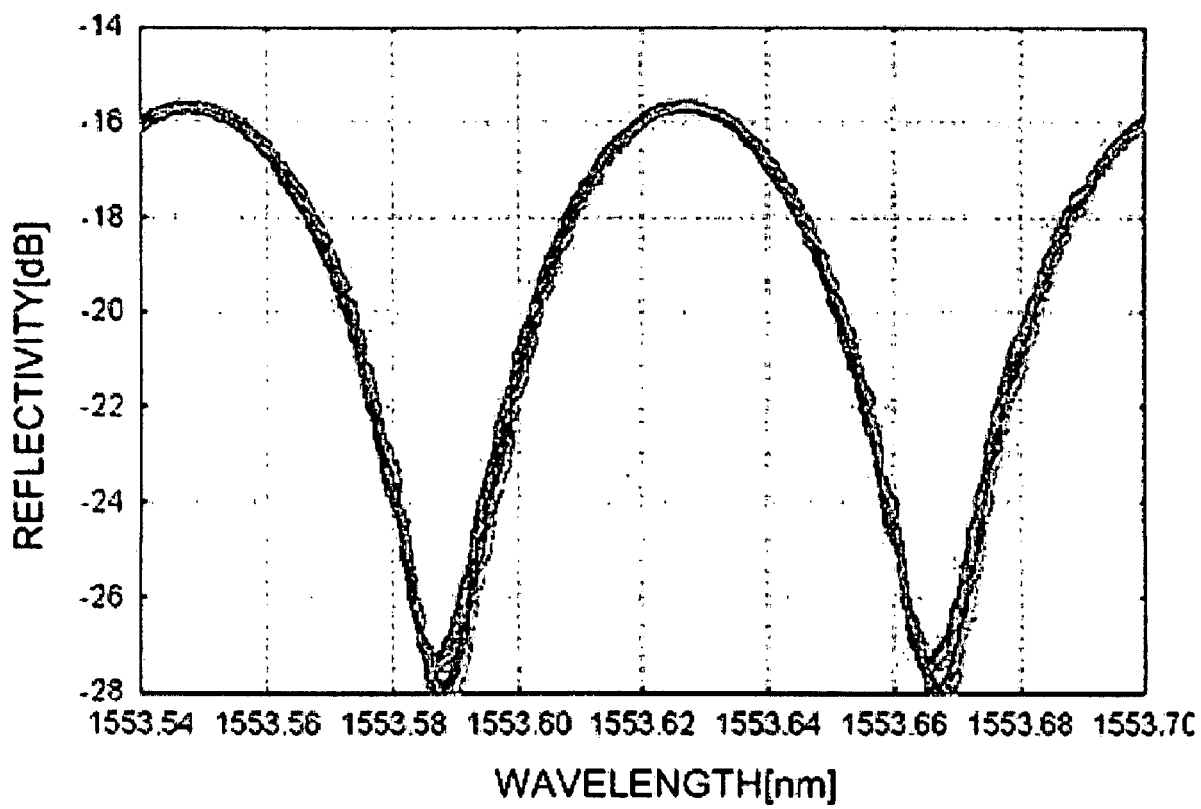
FIG. 10 is a graph of reflectivity versus wavelength in the optical fiber of FIG. 8.

FIG. 10 is a graph of reflectivity versus wavelength in the optical fiber of FIG. 8. As shown in this graph, the polarization properties were seldom observed in FIG. 10. Therefore, PDCW and PDL may be regarded as insignificant. That is, in the optical fiber according to an exemplary embodiment of the present invention, the polarization dependent properties and the birefringence were cancelled, and thus were not observed.

Figure 11:
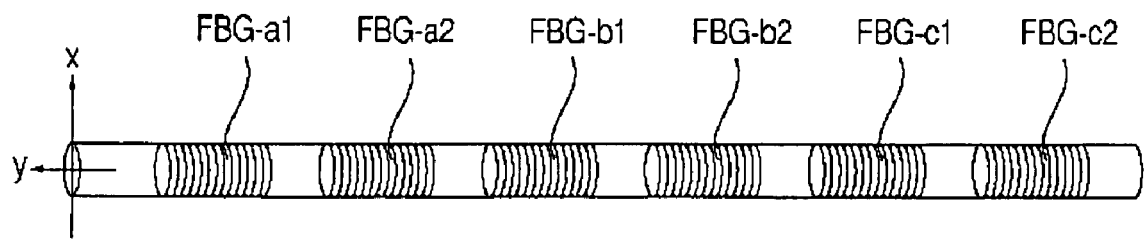
FIG. 11 schematically illustrates a super structured fiber Bragg grating (SSFBG) according to an exemplary embodiment of the present invention.

FIG. 11 illustrates an optical fiber according to another exemplary embodiment of the present invention. In the optical fiber according to another exemplary embodiment of the present invention, Super Structured Fiber Bragg Gratings (SSFBG) comprising six (6) fiber gratings are formed according to the present invention. The direction of a light source for generating fiber gratings identified as FBG-a1, FBG-b1, and FBG-c1 is formed at 90 degrees to the direction of a light source for generating fiber gratings identified as FBG-a2, FBG-b2, and FBG-c2. That is, the polarization effect according to FBG-a1 is cancelled by FBG-a2, the polarization effect according to FBG-b1 is cancelled by FBG-b2, and the polarization effect according to FBG-c1 is cancelled by FBG-c2. Therefore, the SSFBG that comprise fiber gratings formed by being exposed to a light source at different angles according to FIG. 11 have superior polarization properties to the conventional SSFBG.

While the SSFBG of the present exemplary embodiment comprise six (6) fiber gratings, more fiber Bragg gratings or less fiber Bragg gratings may be used. While an odd number of fiber gratings may be used, in order to maximize the cancellation effects, an even number of fiber gratings may be used to make a match.

The use of a method and apparatus for manufacturing fiber gratings according to the present invention enables birefringence and polarization effects caused by fiber gratings in an optical fiber to be efficiently removed or reduced. Also, the optical fiber having fiber gratings according to the present invention has superior optical properties to the conventional optical fiber, and thus it may be used for manufacturing optical equipment having much better performance.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method for manufacturing fiber gratings, comprising:
generating a group of first fiber gratings simultaneously in a first region of an optical fiber by selectively exposing the optical fiber to a light source; and
generating a group of second fiber gratings simultaneously in a second region of the optical fiber by selectively exposing the optical fiber to the light source, the second region being substantially spaced apart from the first region in a longitudinal direction of the optical fiber at a different angle from the group of first fiber gratings about an axis of the optical fiber;

wherein the group of second fiber gratings are formed at one of 90 degrees and 270 degrees to the group of first fiber gratings about the axis of the optical fiber, and wherein generating the group of second fiber gratings includes:

making relative movements of the optical fiber and the light source in the longitudinal direction of the optical fiber; and rotating the optical fiber by one of 90 degrees and 270 degrees about the longitudinal direction of the optical fiber before selectively exposing the rotated optical fiber to the light-source.

2. The method of claim 1, wherein selectively exposing the rotated optical fiber to the light source is performed by installing mask gratings between the light source and the optical fiber.

3. The method of claim 1, wherein the group of first fiber gratings and the group of second fiber gratings are fiber Bragg gratings.

4. A method for manufacturing fiber gratings, comprising:

generating a group of first fiber gratings simultaneously in a first region of an optical fiber by selectively exposing the optical fiber to a moveable light source; and generating a group of second fiber gratings simultaneously in a second region of the optical fiber by selectively exposing the optical fiber to the moveable light source, the second region being substantially spaced apart from the first region in a longitudinal direction of the optical fiber at a different angle from the group of first fiber gratings about an axis of the optical fiber;

wherein the group of first fiber gratings and the group of second fiber gratings are long period fiber gratings.

5. An apparatus for manufacturing fiber gratings, comprising:

a device configured to generate a group of first fiber gratings simultaneously in a first region of an optical fiber by selectively exposing the optical fiber to a moveable light source;

wherein the device is further configured to move the optical fiber in a longitudinal direction of the optical fiber and a radial direction of the optical fiber, to rotate the optical fiber at an angle about an axis of the optical fiber, and to generate a group of second fiber gratings simultaneously in a second region of the optical fiber by selectively exposing the optical fiber to the moveable light source, the second region being substantially spaced apart from the first region in the longitudinal direction, and wherein the device includes:

an optical fiber holder for fixing the optical fiber;

an optical fiber carrier for moving the optical fiber in the longitudinal direction, the radial direction, or the longitudinal direction and the radial direction; and an optical fiber rotator for rotating the optical fiber about the axis of the optical fiber.

6. The apparatus of claim 5, wherein the device includes a mask grating enabling light from the moveable light source to selectively pass through the optical fiber.

7. The apparatus of claim 5, wherein the optical fiber rotator rotates the group of first fiber gratings by one of 90 degrees and 270 degrees about the axis of the optical fiber after generating the group of first fiber gratings, wherein the optical fiber carrier moves the optical fiber by a distance in the longitudinal direction after the group of first fiber gratings is generated, and wherein the group of second fiber gratings is generated on after the optical fiber is rotated and moved.

* * * * *